(12) United States Patent
Vaughn, Jr. et al.

(10) Patent No.: US 9,265,236 B2
(45) Date of Patent: Feb. 23, 2016

(54) TWO-IN-ONE FINCH BIRD FEEDER

(71) Applicant: WOODSTREAM CORPORATION, Lititz, PA (US)

(72) Inventors: William Ray Vaughn, Jr., Lititz, PA (US); Judith Kim Hoysak, Lancaster, PA (US)

(73) Assignee: WOODSTREAM CORPORATION, Lititz, PA (US)

( * ) Notice: Subject to any disclaimer, the term of this patent is extended or adjusted under 35 U.S.C. 154(b) by 0 days.

(21) Appl. No.: 14/749,283

(22) Filed: Jun. 24, 2015

(65) Prior Publication Data

US 2015/0366167 A1 Dec. 24, 2015

Related U.S. Application Data

(63) Continuation of application No. 13/619,008, filed on Sep. 14, 2012, now abandoned.

(51) Int. Cl.
*A01K 39/01* (2006.01)
(52) U.S. Cl.
CPC .................................... *A01K 39/01* (2013.01)
(58) Field of Classification Search
CPC ............................ A01K 39/01; A01K 39/0113
USPC ................................ 119/52.2, 57.8, 57.9, 72
See application file for complete search history.

(56) References Cited

U.S. PATENT DOCUMENTS

| | | | | |
|---|---|---|---|---|
| 4,188,913 A * | 2/1980 | Earl | .................. | A01K 39/0113 119/57.9 |
| 7,909,236 B2 * | 3/2011 | Erdie | ..................... | B65D 59/02 220/281 |
| 7,921,809 B2 * | 4/2011 | Hunter | ................. | A01K 39/012 119/52.2 |
| 8,833,301 B2 * | 9/2014 | Donegan | ................ | A01K 39/01 119/52.2 |
| 2006/0112892 A1 * | 6/2006 | Hunter | ................. | A01K 39/014 119/57.8 |
| 2006/0266295 A1 * | 11/2006 | McDarren | .............. | A01K 45/00 119/57.8 |
| 2007/0163506 A1 * | 7/2007 | Bloedorn | ............. | A01K 39/012 119/52.2 |
| 2012/0234249 A1 * | 9/2012 | Gaze | .................... | A01K 39/012 119/57.8 |

* cited by examiner

*Primary Examiner* — Monica Williams
*Assistant Examiner* — Michael Wang
(74) *Attorney, Agent, or Firm* — Jacobson Holman, PLLC.

(57) ABSTRACT

A bird feeder is provided having a seed reservoir with a side wall that has at least one seed access opening and an adjustable feed port assembly. The feed port assembly includes a base mounted to the side wall in a fixed relationship thereto and having a central opening in communication with the seed in the reservoir. Fitted to the base is a rotatable insert having a perch coupled thereto in fixed relationship so that the perch and insert rotate as a unit. The insert is rotatable between two positions, an upright position in which the perch is below the base central opening enabling birds to feed while standing on the perch, and an upside down position in which the perch is above the base central opening, requiring birds to hang upside down from the perch to feed.

16 Claims, 8 Drawing Sheets

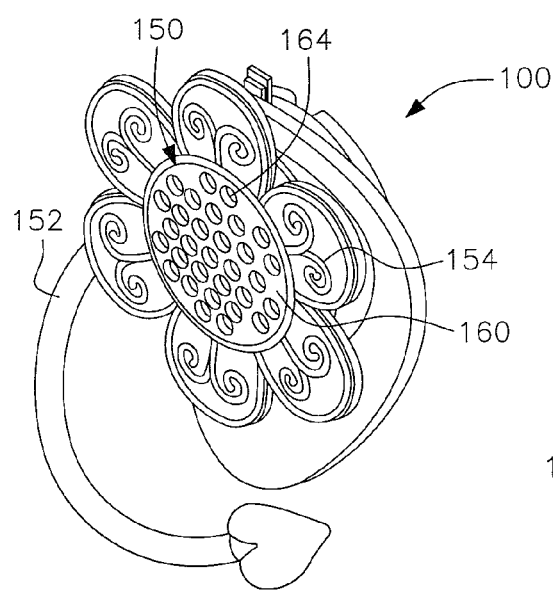
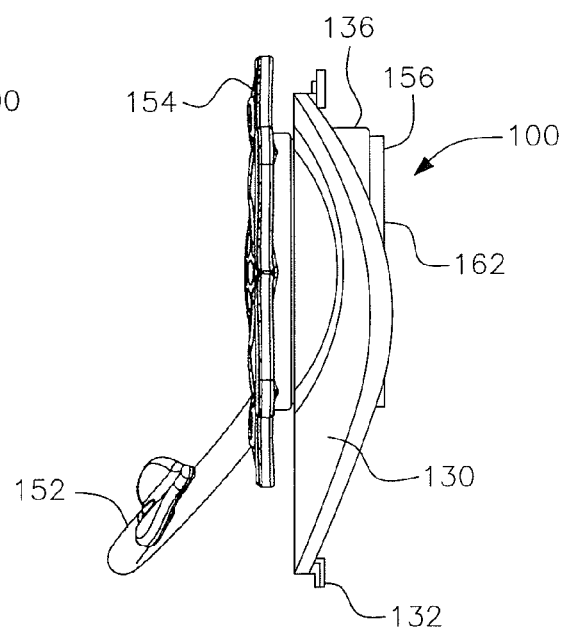
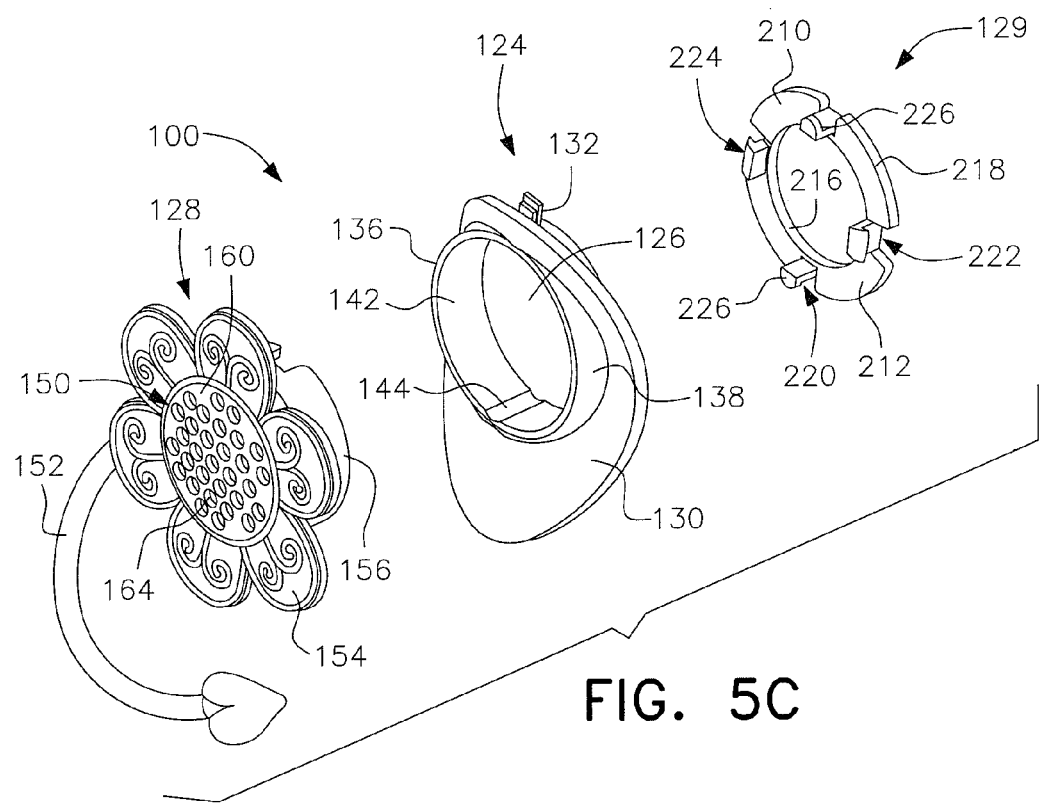
FIG. 5A
FIG. 5B
FIG. 5C

TWO-IN-ONE FINCH BIRD FEEDER

This application is a continuation application of co-pending U.S. application Ser. No. 13/619,008 filed Sep. 14, 2012, the priority of which is hereby claimed.

FIELD OF THE INVENTION

The present invention generally relates to bird feeders for attracting and feeding wild birds. More particularly, the present invention concerns a bird feeder having a feed port assembly with a base mounted adjacent a seed reservoir opening in a fixed position and a rotatable insert having a perch fixed thereto that can be locked to the base in two positions. In a first position, the perch is positioned below the seed reservoir opening to allow birds to feed right side up. In a second position, the perch is positioned above the feed port, limiting access to those birds that can feed upside down, such as gold finches.

BACKGROUND OF THE INVENTION

Persons have long used bird feeders, birdbaths, and the like to attract birds of various types to their homes, both to view the birds and to feed the birds out of concern for their welfare in the event that food is scarce, as in winter. Different types of feeders have been developed, which each dispense foodstuffs that are preferred by a selected variety of bird that a person might desire to attract. For example, seeds, grains, suets, and nectars are common foodstuffs that can be dispensed by a selected type of feeder.

Seed dispensing birdfeeders are perhaps the easiest and most popular way of attracting a myriad of wild birds to a particular location for viewing. This is especially so in the winter months when food is scarce. Typically, seed feeders are suspended from or supported by a pole or post or hung from a tree branch so as to elevate the feeder above the ground and are built to hold and protect the seed from the elements.

There are a variety of seed feeders that have been constructed to attract various species of wild birds. One popular type is the tube feeder. Tube feeders are hollow, cylindrical tubes, often made of plastic, and have multiple feeding stations spaced along the length of the tube. Typically, feeding stations include a feed port and an adjacent perch, such as a radially extending post, positioned below the feed port to provide the feeding bird with a place to alight and then obtain seed through the port while the bird stands on the perch. Feeders intended for gold finches, however, who like to feed while in an upside down position, are made with the perch positioned above the feed port. Other birds such as nuthatches, and some varieties of woodpeckers, also like to eat upside down and will do so if a suitable bird supporting structure is available to them.

Thistle seed is attractive to finches and can be effectively dispensed with a tube feeder having a plurality of feeding stations. However, thistle seed is also attractive to other birds as well. Since thistle seed is one of the more expensive seeds on the market, when a consumer wants to attract gold finches using thistle seed it would be advantageous if other birds could be prevented from also consuming the seed. At other times, however, the consumer may want to use the feeder to dispense other types of seeds without concern for the type of birds that are able to feed. Accordingly, it would be advantageous to the consumer to have a feeder with an adjustable feed port assembly that can be configured to allow birds to feed in either an upright position or an upside-down position.

SUMMARY OF THE INVENTION

Accordingly, the present invention is directed to a bird feeder having a reservoir with a sidewall for holding seed. The sidewall includes a least one opening through which birds can access seed held in the reservoir. Connected to the reservoir sidewall within the opening is a feed port assembly that includes a stationary base having a central opening into which is fitted a rotatable insert. The central opening in the stationary base is generally about the size of the sidewall opening in the reservoir. The insert has a body that largely covers the base central opening to retain seed in the reservoir, while having a plurality of small openings therein to allow appropriately sized birds to access seed through the openings. The insert also has a perch connected thereto that extends from the insert body and is movable therewith as a unit. The insert body may also be provided with ornamental features to enhance the appearance of the feed port assembly, such as simulated flower petals or the like.

When connected to the base, the insert may be adjusted between one of two positions. In a first position, referred to herein as the upright position, the insert is oriented in the base so that the perch is below the sidewall opening in the reservoir. In a second position, referred to herein as the upside down position, the insert is oriented in the base so that the perch is above the sidewall opening. Hence, when the insert is in the upright position, birds access seed through the small openings while standing on the perch. Conversely, when the insert is in the upside down position, birds can access seed through the openings in the body by hanging upside down from the same perch. The consumer is free to position the insert in either position, depending upon which type or types of birds the consumer wants to attract to the feeder for feeding.

In view of the foregoing, it is an object of the present invention to provide a new and useful bird feeder having a feed port assembly that is adjustable by the consumer to allow birds to feed in either an upright position or an upside down position.

Another object of the present invention is to provide an improved bird feeder in accordance with the preceding object in which both upright and upside down feeding positions are provided by a single perch that is part of the same feed port assembly.

Yet another object of the present invention is to provide an improved bird feeder in accordance with the preceding objects in which the feed port assembly includes a stationary base fitted with a movable insert that is integral with or coupled to the perch, the insert with perch being rotatable within the base to move between two positions, an upright position enabling birds to feed standing on the perch and an upside down position requiring the birds to hang upside down from the perch to feed.

Still another object of the present invention is to provide a bird feeder in accordance with the preceding objects that provides finches with two orientations for feeding, effectively making the feeder a two-in-one finch feeder.

A still further object of the present invention is to provide an improved bird feeder in accordance with the preceding objects that is not complex in structure and which can be manufactured at low cost but yet efficiently enables the consumer to change the configuration of the feeder to best attract the type or types of birds desired.

BRIEF DESCRIPTION OF THE FIGURES

FIG. 5A is a front perspective view of a second embodiment of an adjustable feed port assembly in accordance with the present invention.

FIG. 5B is a side view of the feed port assembly shown in FIG. 5A.

FIG. 5C is an exploded perspective view of the components of the feed port assembly shown in FIG. 5A, including a base, an insert and a connecting member.

DETAILED DESCRIPTION OF THE PREFERRED EMBODIMENTS

Figure 1:
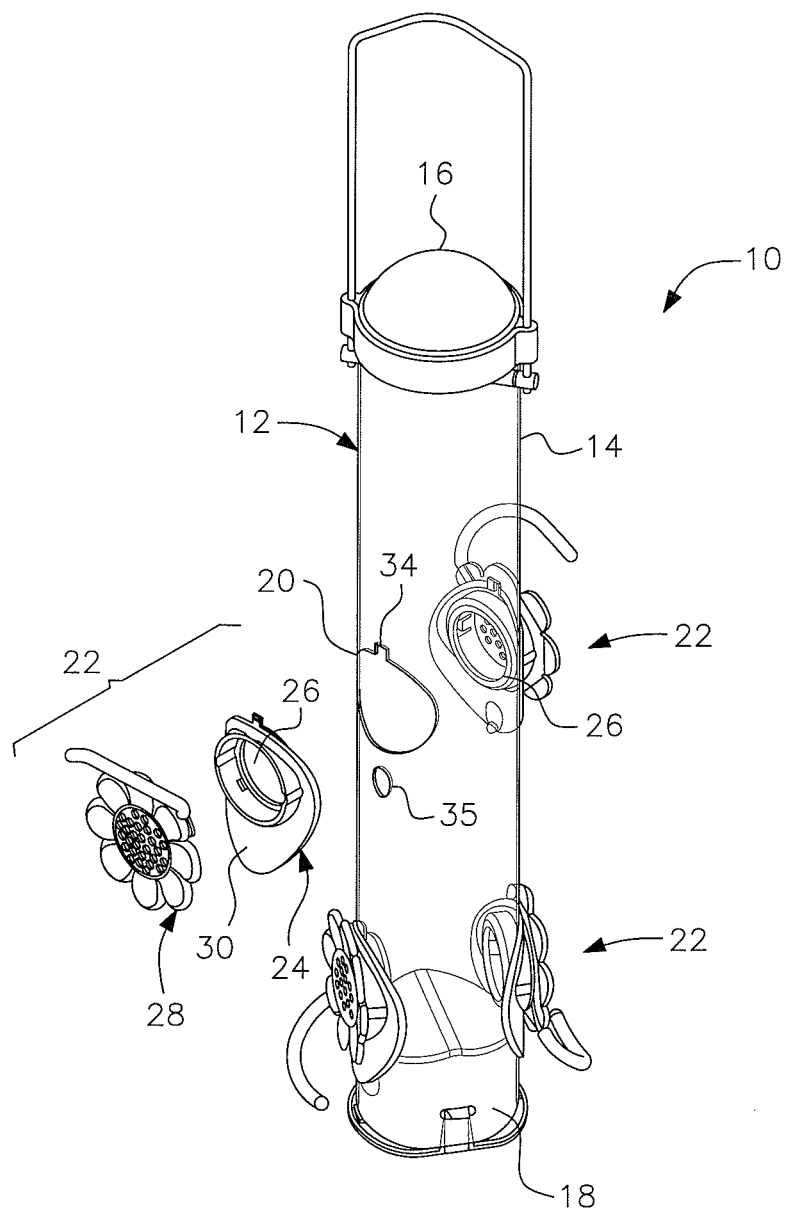
FIG. 1 is a perspective view of one embodiment of an adjustable port bird feeder in accordance with the present invention in which the components of one of the feed port assemblies are shown in an exploded view.
Figure 2A:
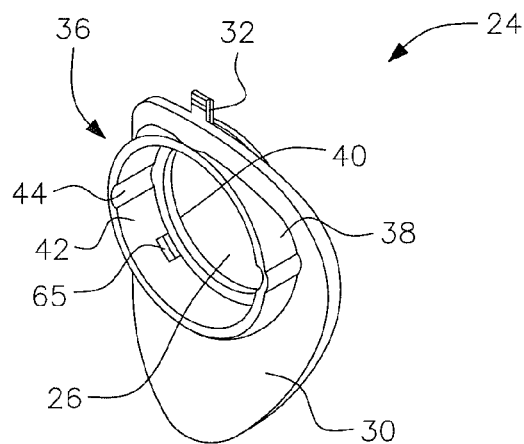
FIG. 2A is a front perspective view of the base for the feed port assemblies shown in FIG. 1.
Figure 2B:
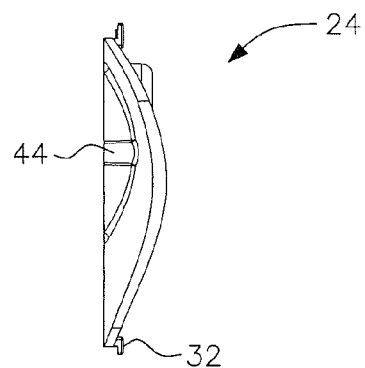
FIG. 2B is a side view of the base shown in FIG. 2A.
Figure 2C:
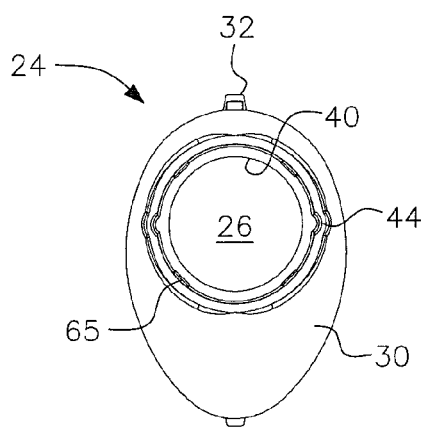
FIG. 2C is a front view of the base shown in FIG. 2A.
Figure 2D:
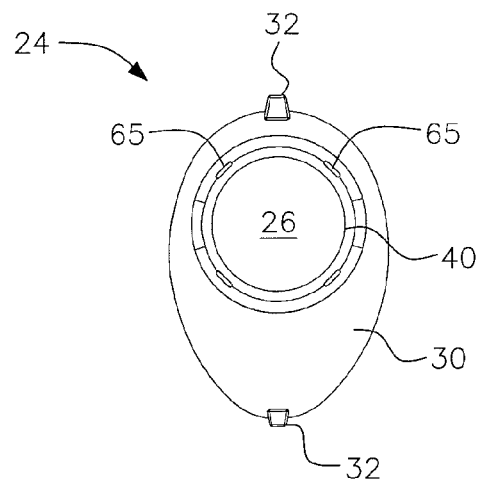
FIG. 2D is a rear view of the base shown in FIG. 2A.
Figure 3A:
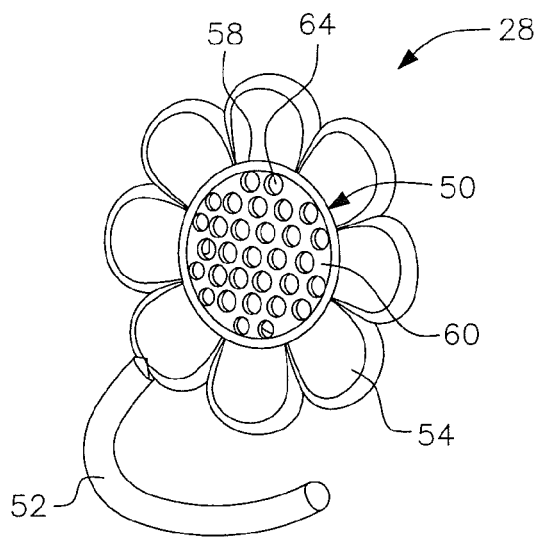
FIG. 3A is a front perspective view of the insert for the feed port assemblies shown in FIG. 1.
Figure 3B:
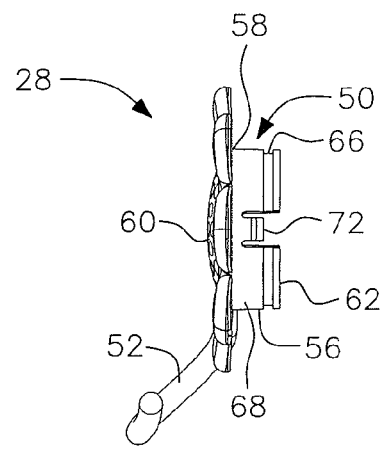
FIG. 3B is a side view of the insert shown in FIG. 3A.
Figure 3C:
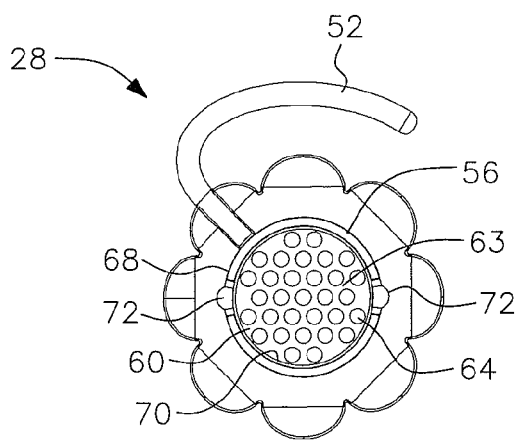
FIG. 3C is a rear view of the insert shown in FIG. 3A.
Figure 3D:
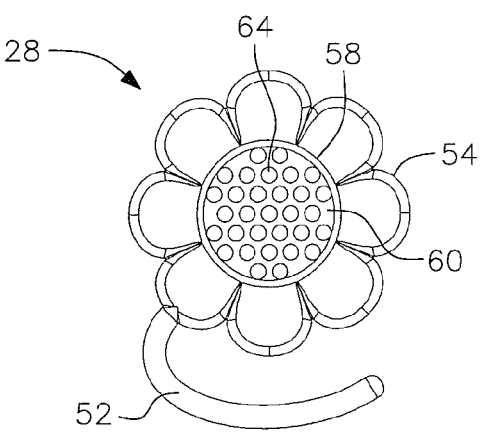
FIG. 3D is a front view of the insert shown in FIG. 3A.

In describing preferred embodiments of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

As used herein, "front" refers to the side of a component that faces outwardly from the bird feeder when the feed port assembly is assembled onto the reservoir. Conversely, "rear" refers to the opposite side, namely the side of the component that faces the interior of the reservoir of the bird feeder when assembled.

As shown in FIG. 1, according to a first embodiment the present invention is directed to a bird feeder generally designated by reference numeral 10. The bird feeder has a reservoir generally designated by reference numeral 12 with a side wall 14 for holding seed, a cover 16 and a feeder base 18. The reservoir side wall 14 has at least one reservoir site wall opening 20 that allows for seed access through the side wall of the reservoir. Fitted within the opening is a feed port assembly generally designated by reference numeral 22.

As shown in FIG. 1, the feed port assembly 22 includes a base generally designated by reference numeral 24 with a central opening 26 and a rotatable insert generally designated by reference numeral 28. According to the first embodiment, both the base 24 and the insert 28 are made of a plastic material such as polypropylene, although other suitable plastics could be used.

In the illustrated embodiment, the base 24 has a mounting body 30 that is curved to match the generally cylindrical side wall of the reservoir 12; such curvature is not required, however, depending upon the shaping of the reservoir. The mounting body 30 attaches to the reservoir side wall opening 20 by securing tabs 32 on the base 24 into corresponding notch 34 and opening 35 formed in the sidewall 14. Other means of attachment could also be used as would be known by persons of skill in the art. The base 24 thus remains connected in a fixed position with respect to the reservoir sidewall opening 20 both in use and when changing the orientation of the insert relative to the base.

As shown in greater detail in FIGS. 2A-2D, the base 24 includes a collar generally designated by reference numeral 36, which projects outwardly and rearwardly from the mounting body 30. In the illustrated embodiment, the collar 36 has a generally cylindrical sidewall 38, with the inner diameter of the collar 36 being slightly larger than the inner diameter of the base central opening 26 to form a generally circular lip 40 that is used to secure the insert 28 in the base 24. Positioned adjacent and inwardly of the circumference of the lip are a plurality of lugs 65 spaced approximately equidistantly from one another around the lip. In the illustrated embodiment, four lugs are provided. The inner surface 42 of the collar is generally cylindrical and has two positioning grooves 44 on opposing sides of the collar sidewall 38 that extend generally perpendicular to the mounting body 30.

The rotatable insert 28 is shown in greater detail in FIGS. 3A-3D. The insert 28 includes a body generally designated by reference numeral 50 and a perch 52. The insert may also optionally include ornamental features 54 such as simulated flower petals as shown in FIG. 1 and FIGS. 3A-3D. Other ornamental features could be utilized as known to those skilled in the art.

The body 50 of the insert 28 has an insertion part 56 and a face plate 60. The insertion part 56 includes sidewall 68 which is sized to be at least partly received within the base central collar 36. The front end 58 of the sidewall 68 is covered by the face plate 60, but the rear end is left open to provide open area 63 (see FIG. 3C), having direct communication with the central opening 26 in the base 24 and thereby with seed in the reservoir. Thus seed in the reservoir can fill the open area 63 inside sidewall 68 through central opening 26. The face plate 60 in the illustrated embodiment is generally circular and includes a plurality of seed accessing holes 64 therein to allow appropriately sized birds to access seed through the openings 64. Also in the illustrated embodiment, the insertion part 56 is generally cylindrical to correspond with the generally cylindrical sidewall of the collar 36.

The side will 68 has a radial channel 66 adjacent its rear end 62 that, in conjunction with the lip, is used to engage the insert 28 with the base 24. More particularly, the lugs 65 on the inner surface 42 of the collar side wall 38 (see FIGS. 2A and 2C) are received within the channel 66 and ride therein when the insert is rotated. The sidewall 68 of the insertion part 56 is further provided with two detents 72 on opposing sides of the insertion part 56. The detents 72 are received within the positioning grooves 44 formed on the inner surface 42 of the collar sidewall 38 when the insert is connected to the base.

The perch 52 is coupled in a fixed relationship to the body 50 or is molded therewith so as to provide a single unitary unit. While shown as a curved member, the perch may be made in a variety of shapes suitable for use by a bird in perching upright or hanging upside down in the manner described herein.

Figure 4A:
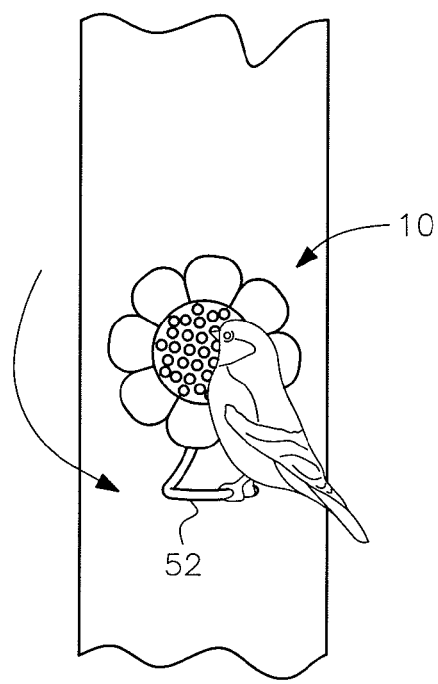
FIG. 4A illustrates a feed port assembly as shown in FIG. 1 with a bird feeding thereon in the upright position in accordance with the present invention.
Figure 4B:
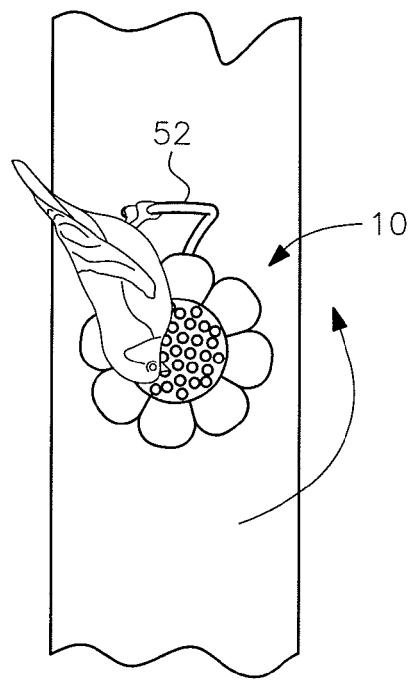
FIG. 4B illustrates a bird feeding on the same feed port assembly as that shown in FIG. 4A, but now in the upside down position in accordance with the present invention.
Figure 6A:
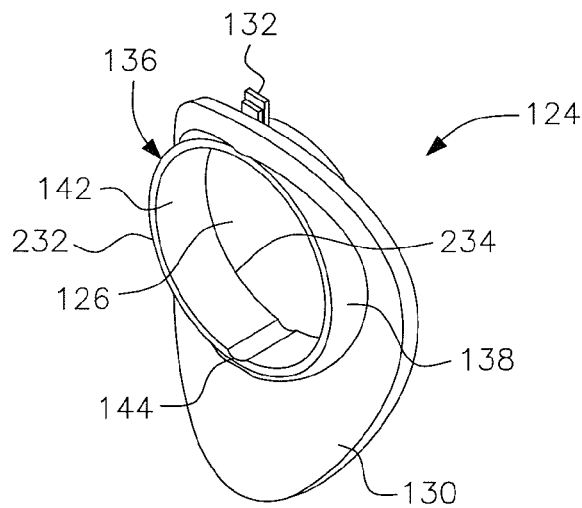
FIG. 6A is a front perspective view of the base shown in FIGS. 5A-5C.
Figure 6B:
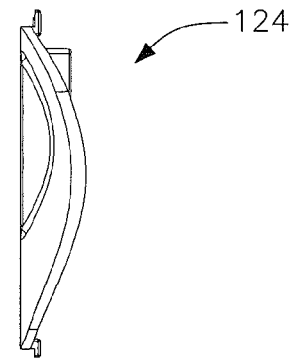
FIG. 6B is a side view of the base shown in FIG. 6A.
Figure 6C:
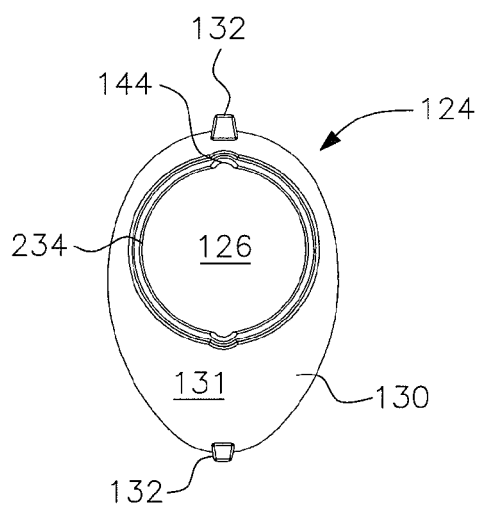
FIG. 6C is a rear view of the base shown in FIG. 6A.
Figure 6D:
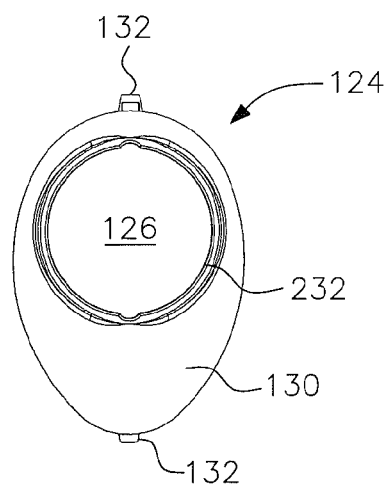
FIG. 6D is a front view of the base shown in FIG. 6A.
Figure 7A:
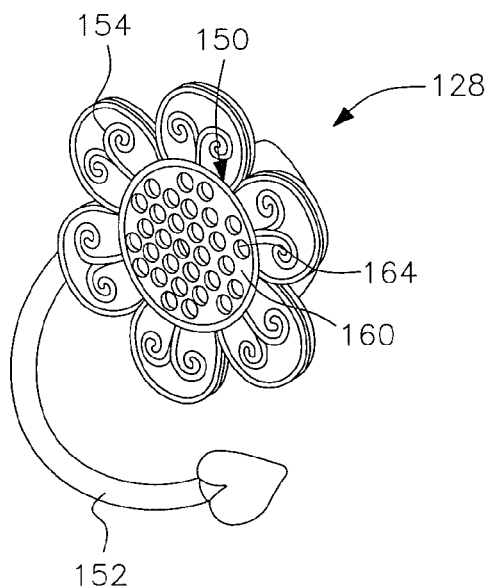
FIG. 7A is a front perspective view of the insert shown in FIGS. 5A-5C.
Figure 7B:
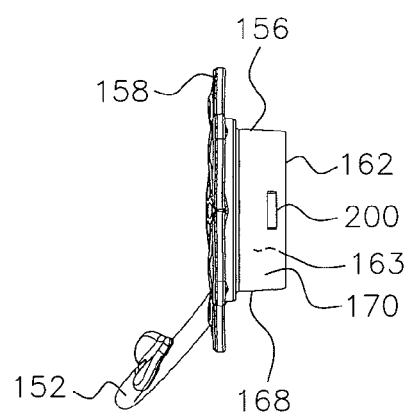
FIG. 7B is a side view of the insert shown in FIG. 7A.
Figure 7C:
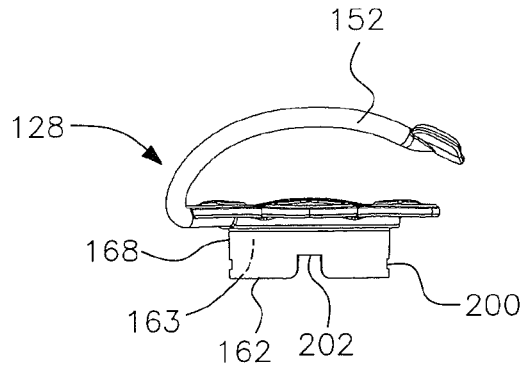
FIG. 7C is a top view of the insert shown in FIG. 7A.
Figure 7D:
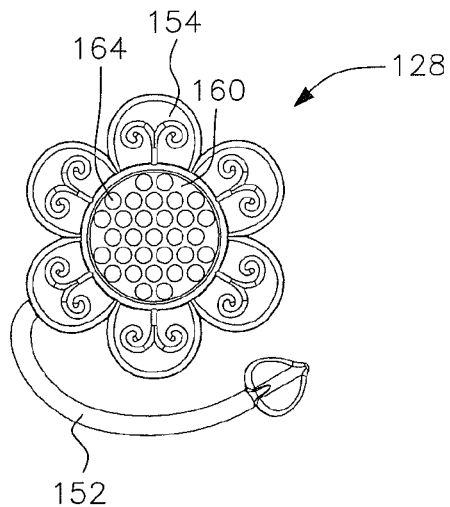
FIG. 7D is a front view of the insert shown in FIG. 7A.
Figure 8A:
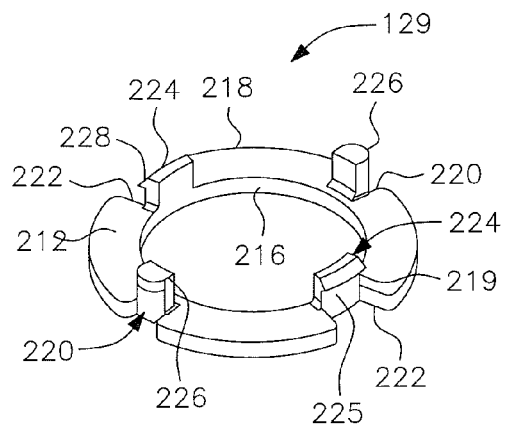
FIG. 8A is a front perspective view of the connecting member shown in FIGS. 5A-C.
Figure 8B:
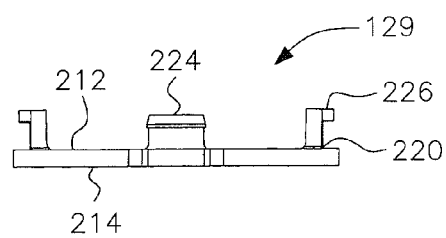
FIG. 8B is a side view of the connecting member shown in FIG. 8A.
Figure 8C:
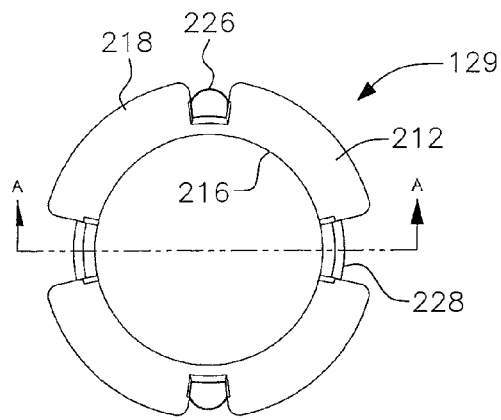
FIG. 8C is a front view of the connecting member shown in FIG. 8A.
Figure 8D:
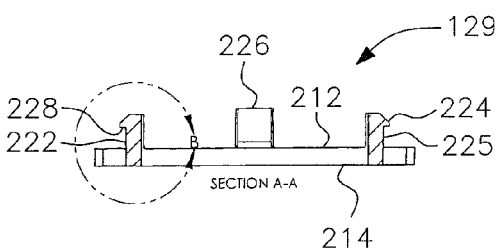
FIG. 8D is a cross-sectional view of the connecting member shown in FIG. 8C.
Figure 8E:
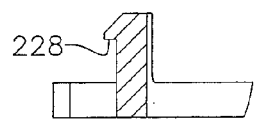
FIG. 8E is an enlarged view of Detail B shown in FIG. 8D.

As already noted, the insert 28 is adjustable between two positions when coupled to the base 24: an upright position and an upside down position. When the insert is in the upright position, the perch 52 is below the face plate 60 and the seed accessing holes 64 therein as shown in FIG. 4A. Alternatively, when the insert 28 is in the upside down position, the perch 52 is above the face plate and seed accessing holes 64 so that birds hang upside down from the perch as shown in FIG. 4B. These two positions are essentially 180 degrees apart as defined by the positioning grooves 44 in the collar 36 and the detents 72 on the insertion part 56.

In particular, the positioning grooves 44 may be defined as including a first positioning groove and an opposing positioning groove for purposes of description; there is no difference between the grooves and either groove can be designated the first positioning groove in which case the other groove is necessarily designated the opposing positioning groove. Similarly, the detents 72 may be defined as including a first detent and an opposing detent for purposes of description; there is no difference between the detents and either detent can be designated the first detent in which case the other detent is necessarily designated the opposing detent. The insert 28 is in the upright position when the first detent is aligned with the first positioning groove and the opposing detent is aligned with the opposing positioning groove, and the insert 28 is in the upside position when the first detent is aligned with the opposing positioning groove and the opposing detent is aligned with the first positioning groove.

To change the orientation of the insert from the upright position to the upside position or vice versa, the user has only to rotate the insert 180 degrees. The detents 72, while having sufficient engagement within the positioning grooves to hold the insert in either one of the two positions while the feeder is in use, are flexible enough to be pressed inwardly out of the grooves and against the inner surface of the collar when rotational force is applied by the user to rotate the insert 180 degrees to the other of the two positions.

A feed port assembly according to a second embodiment of the present invention is shown in FIGS. 5A-5C. The second embodiment of the feed port assembly, generally designated by reference numeral 100, includes a base, generally designated by reference numeral 124, with a central opening 126, a rotatable insert generally designated by reference numeral 128, and a connecting member generally designated by reference numeral 129. According to the second embodiment, both the base 124 and the insert 128 are made of metal, such as zinc, while the connecting member 129 is made of a plastic material such as polypropylene.

Like the first embodiment, the base 124 has a mounting body 130 that is curved to match the generally cylindrical side wall of the reservoir; such curvature is not required however, depending upon the shaping of the reservoir. The mounting body 130 attaches to the reservoir side wall opening 20 by securing tabs 132 on the base into corresponding notch 34 and opening 35 formed in the top of the reservoir sidewall opening and below the opening, respectively. Other means of attachment could also be used as would be known by persons of skill in the art. As in the first embodiment, the base remains fixed as mounted on the reservoir sidewall both in use and when the insert is being adjusted.

As shown in greater detail in FIGS. 6A-6D, the mounting body 130 includes a central collar 136 having a generally cylindrical sidewall 138. The inner surface 142 of the collar 136 is provided with two positioning grooves 144 on opposing sides of the inner surface 142 of the collar sidewall 138 that extend generally perpendicularly to the mounting body. These positioning grooves 144 serve to guide positioning tabs 226 of the connecting member 129 so as to engage the connecting member as coupled to the insert in the desired orientation within the opening 126 of the base 124.

The rotatable insert 128 is shown in greater detail in FIGS. 7A-7D. As in the first embodiment, the insert 128 includes a body generally designated by reference numeral 150 and a perch generally designated by reference numeral 152. The insert may also optionally include ornamental features 154 such as simulated flower petals.

The mounting body 130 of the insert 128 has an insertion part 156 and a face plate 160. The insertion part 156 has a generally cylindrical sidewall 168 and is sized to be received within the base collar 136. The outer end 158 of the insertion part 156 is covered by the face plate 160 which, in the illustrated embodiment, is generally circular. The inner end 162 of the generally cylindrical insertion part 156 is not covered, leaving open area 163 which is in direct communication with the central opening 126 in the base 124 and thereby with seed in the reservoir. The face plate 160 includes a plurality of seed accessing holes 164 therein to allow appropriately sized birds to access seed in the open area 163 through the openings 164.

The sidewall 168 of the insertion part 156 is provided with slots 200 on two opposing sides to receive locking tabs on the connecting member 129 (see FIGS. 8A-8E), as will be described hereinafter. The sidewall 168 of the insertion part 156 is also provided with two notches 202 on a second set of opposing sides of the sidewall; the opposing sides of the sidewall having the slots 200 are approximately 90 degrees offset from the second set of opposing sidewalls having the notches 202. The notches 202 provide clearance for the positioning tabs 226 when the feed port assembly is being assembled.

The perch 152 is coupled to the body 150 in a fixed relationship or formed therewith so as to be movable as a single unit. As with the first embodiment, the perch 152 may be made in a variety of shapes suitable for use by a bird in perching upright or hanging upside down in the manner described herein.

The base 124 and the insert 128 are coupled to one another by the connecting member generally designated by reference numeral 129 which is shown in FIGS. 8A-8E. The connecting member 129 has an annular body 210, a generally flat front surface 212, a generally flat rear surface 214, a cylindrical inner wall 216 and a substantially cylindrical outer wall 218. The outer wall 218 includes four cutouts spaced approximately 90 degrees from one another around the circumference of the outer wall 218. Hence, there are two sets of opposing cutouts, a first set referred to herein as insert positioning tab cutouts generally designated by reference numeral 220, and a second set referred to herein as locking tab slots generally designated by reference numeral 222.

Each of the locking tab slots 222 includes a locking tab generally designated by reference numeral 224 positioned therein and projecting outwardly from the front surface of the body 210. Each locking tab 224 includes an arm 225 and an outwardly directed lip 228 at the end of the arm. The arm 225 is generally perpendicular to the body 210, while the lip 228 is generally parallel with the annular body 210 and spaced therefrom by the arm 225. The radial width of the arm 225 is less than the radial width of the annular body 210 so that, even with the locking tabs 224 inserted in the locking tab slots 222, the arm 225 is inset from the outer circumference of the annular body so that the outermost part of the slot 222 remains as a notch 219, albeit shallower than the insert positioning tab cutouts 220. The notch 219 is aligned with the outer diameter of the insert surface 170.

As in the first embodiment, the insert 128 may be adjusted to be in one of two positions when connected to the base 124, the two positions being essentially 180 degrees apart so that if the insert is connected to the base in the upright position the perch is below the face plate and the seed accessing holes (see FIG. 4A) while if the insert is connected to the base in the upside down position, the perch is above the face plate and seed accessing holes (see FIG. 4B). These two positions are defined by the insert positioning tabs 226 in the connecting member 129 which, in cooperation with the notches 202 on the insertion part 156, are engaged with the grooves 144 in the inner surface 142 of the collar sidewall.

The feed port assembly 100 according to the second embodiment is assembled as follows. The base 124 is mounted to the seed reservoir by inserting the collar 136 of the base 124 into the reservoir side wall opening 20, aligning the tabs 132 on the mounting body 30 with the notch 34 and opening 35 in the reservoir side wall and securing the mounting body 130 against the outer surface of the side wall opening by inserting the tabs into the notch and opening. The connecting member 129 is coupled to the insert 128 by pressing the front side of the connecting member into the back of the insert until the locking tabs 224 on the connecting member snap into the slots 200 in the opposing sides of the insert, thereby securing the connecting member to the insert. When the locking tabs 224 are secured in the slots 200, the insert positioning tabs 226 extend through the notches 202 on the insert and into the positioning grooves 144 on the base collar 136. The engagement between the insert positioning tabs 226 on the connecting member and the positioning grooves 144 on the base collar 136 holds the insert in the desired right side up or upside down orientation in use. To change the orientation of the insert from the upright position to the upside position or vice versa, the user has only to rotate the insert 180 degrees. The positioning tabs 226, while having sufficient engagement within the insert positioning grooves 144 to hold the insert in either one of the two positions while in use, are flexible enough to be pressed inwardly out of the grooves and against the inner surface of the collar when rotational force is applied by the user to rotate the insert 180 degrees to the other of the two positions.

With the feed port assembly having an insert 150 and perch 152 that are mounted within a base and rotatable with respect to the base between two positions as described herein, the consumer is able to use the feeder as strictly a thistle seed gold finch feeder, i.e., with the feed port assembly in the upside down position so that the perch is above the seed access openings and, when and if desired, can easily convert the same feeder into a general access, regular seed type bird feeder in which the perch is positioned below the seed access opening to accommodate not only finches but also birds who feed only from an upright position.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

What is claimed is:

1. A bird feeder comprising:
   a seed reservoir having a side wall with at least one opening therein through which birds can access seed held within the reservoir; and
   an adjustable feed port assembly including a base and a rotatable insert fitted to said base, said base mounted to the side wall in a fixed position and having a central opening in communication with the opening in the reservoir side wall to form a bird accessible seed access opening through which birds can access seed;
   said insert including a body and a perch in fixed relationship to one another, said body having an inner side and an outer side, said inner side including a connecting part coupled to said base when the feeder is assembled for use, said outer side including a face plate having a central part with a plurality of uniformly sized seed accessing holes therein through which birds access seed, said plurality of uniformly sized seed accessing holes substantially aligned with, and being dispersed over an area substantially equal to, said bird accessible seed access opening;
   said insert being rotatable within the base between two positions, an upright position in which the perch is below the seed access opening enabling birds to feed while standing on the perch and an upside down position in which the perch is above the seed access opening requiring that the birds hang upside down from the perch to feed, said bird accessible seed access opening remaining open and in the same size in both of said two positions.

2. The bird feeder as set forth in claim 1, wherein rotation of said insert does not change a size of said on sized seed accessing holes.

3. The bird feeder as set forth in claim 1 wherein reorienting the insert between said upright and upside down positions requires that the insert be rotated about 180 degrees.

4. The bird feeder as set forth in claim 1, wherein the base includes a mounting body fitted within the reservoir sidewall opening and an outwardly projecting collar configured to receive and be coupled to said insert body.

5. The bird feeder as set forth in claim 4, wherein said connecting part of said insert body is at least partially received within said base collar and coupled thereto when the feeder is assembled for use, said face plate positioned on an outer end of said connecting part.

6. The bird feeder as set forth in claim 5, wherein the base collar has a generally cylindrical sidewall, an inner surface of said sidewall having two grooves on opposing sides of said sidewall, said grooves extending generally perpendicular to the mounting body, said connecting part also having a generally cylindrical sidewall, an outer surface of said connecting part sidewall having two detents on opposing sides of the connecting part to engage within said pair of grooves in the base collar and restrain rotation of said insert when the feeder is in use.

7. The bird feeder as set forth in claim 6, wherein said pair of grooves include a first groove and an opposing groove, and said pair of detents include a first detent and an opposing detent, said insert being in the upright position when said first detent is aligned with said first groove and said opposing detent is aligned with said opposing groove, and said insert being in said upside down position when said first detent is aligned with said opposing groove and said opposing detent is aligned with said first groove.

8. The bird feeder as set forth in claim 6, wherein said connecting part has a radial channel adjacent a rear edge of said connecting part, the inner surface of the sidewall of said base collar having a plurality of lugs that are received and ride within said radial channel to rotatably secure the insert to the base.

9. The bird feeder as set forth in claim 6, further comprising a connecting member engaged between said insert and said base, said connecting member being configure to be coupled to and rotate with said insert within said base.

10. The bird feeder as set forth in claim 9, wherein said connecting member has a body with two locking tabs positioned on opposing sides of said body and projecting from a front side of said body, said locking tabs being received within two slots formed on opposing sides of the cylindrical sidewall of the connecting part.

11. The bird feeder as set forth in claim 10, wherein said connecting member body further includes two insert positioning tabs on a second set of opposing sides of said body and projecting from said front side, said insert positioning tabs being offset from said locking tabs by about 90 degrees, said insert positioning tabs engaging with said grooves on said collar sidewall to secure the insert in one of the right side up or upside down positions within the base.

12. The bird feeder as set forth in claim 1, wherein said face plate has a perimeter part encircling and extending outwardly from said central part and generally parallel therewith, said perch extending outwardly from one side of said perimeter part in a first direction and then curving back in a second direction generally opposite said first direction, a free end of said perch being substantially parallel with said seed reservoir side wall.

13. A bird feeder comprising:
 a seed reservoir having aside wall with at least one opening therein that forms a side wail opening through which birds can access se ad held within the reservoir, said side wall opening being surrounded by a collar;
 an adjustable feed port assembly fitted within said side wall opening and including a perch, said feed port assembly having an insert body that defines a bird accessible seed access opening in alignment with the side wall opening through which birds may pick an seeds when the feeder is in use, said insert body being coupled to said perch and rotatable therewith relative to the seed reservoir collar between a first orientation in which the perch is below the bird accessible seed access opening enabling birds to feed while standing on the perch and a second orientation in which the perch is above the bird accessible seed access opening requiring that the birds hang upside down from the perch to feed, said bird accessible seed access opening remaining open and in the same size in both said first and said second orientations; and
 said insert body having an inner side contactable by seed in the reservoir, and an outer side opposite said inner side and outside of said reservoir, said outer side having a perimeter that is larger than the bird accessible seed access opening, said perch extending outwardly from one outer edge of said perimeter in a first direction and then curving back in a second direction generally opposite said first direction, a free end of said perch being substantially parallel with said see reservoir wall;
 wherein said insert body has an inner side and an outer side, said inner side including a connecting part coupled to said collar when the feeder is assembled for use, said outer side including a face plate having a plurality of uniformly sized seed accessing holes therein through which birds access seed, said plurality of uniformly sized seed accessing holes together defining said bird accessible seed access opening;
 wherein said seed accessing holes are dispersed over an area substantially equal to said side wall opening.

14. The bird feeder as set forth in claim 13, wherein said adjustable feed port assembly includes a mounting body fitted within the reservoir side wall opening in a fixed position, said collar fixed to said mounting body, said collar configured to receive and be coupled to said insert body, said collar having a central opening in communication with the side wall opening through which birds can access seed.

15. The bird feeder as set forth in claim 14, wherein said insert body has a radial channel adjacent a rear edge thereof, the inner surface of the sidewall of said collar having a plurality of lugs that are received and ride within said radial channel to rotatably secure the insert body to the mounting body.

16. The bird feeder as set forth in claim 13, wherein rotation of said insert body does not change a size of said uniformly sized seed accessing holes.

\* \* \* \* \*